(12) United States Patent
Borden et al.

(10) Patent No.: US 12,092,744 B2
(45) Date of Patent: Sep. 17, 2024

(54) LIGHT DETECTION AND RANGING (LIDAR) ASSEMBLY HAVING A SWITCHABLE MIRROR

(71) Applicant: UATC, LLC, San Francisco, CA (US)

(72) Inventors: Michael Bryan Borden, San Francisco, CA (US); James Allen Haslim, Dublin, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 847 days.

(21) Appl. No.: 17/129,961

(22) Filed: Dec. 22, 2020

(65) Prior Publication Data

US 2022/0179091 A1  Jun. 9, 2022

Related U.S. Application Data

(60) Provisional application No. 63/123,074, filed on Dec. 9, 2020.

(51) Int. Cl.
| | | |
|---|---|---|
| *G01S 17/931* | (2020.01) | |
| *G01S 7/481* | (2006.01) | |
| *G01S 17/894* | (2020.01) | |
| *G02B 26/08* | (2006.01) | |

(52) U.S. Cl.
CPC ........... *G01S 17/931* (2020.01); *G01S 7/481* (2013.01); *G01S 17/894* (2020.01); *G02B 26/0833* (2013.01)

(58) Field of Classification Search
None
See application file for complete search history.

(56) References Cited

U.S. PATENT DOCUMENTS

2018/0284286 A1 * 10/2018 Eichenholz ............. G01S 17/89
2020/0025881 A1 *  1/2020 Li ........................... B60K 35/00

FOREIGN PATENT DOCUMENTS

JP      2014081332 A  *  5/2014  ............. G01S 17/42

* cited by examiner

*Primary Examiner* — Luke D Ratcliffe
(74) *Attorney, Agent, or Firm* — Dority & Manning, P.A.

(57) ABSTRACT

A LIDAR assembly is provided. The LIDAR assembly includes a LIDAR unit. The LIDAR unit includes a housing defining a cavity. The LIDAR unit further includes a plurality of emitters disposed within the cavity. Each of the plurality of emitters is configured to emit a laser beam. The LIDAR assembly further includes a switchable mirror. The switchable mirror is positioned relative to the LIDAR unit such that the switchable mirror receives a plurality of laser beams exiting the housing of the LIDAR unit. The switchable mirror is configurable in at least a reflective state to direct the plurality of laser beams along a first path and a transmissive state to direct the plurality of laser beams along a second path that is different than the first path to widen a field of view of the LIDAR unit along a first axis.

20 Claims, 12 Drawing Sheets

LIGHT DETECTION AND RANGING (LIDAR) ASSEMBLY HAVING A SWITCHABLE MIRROR

RELATED APPLICATION

The present application is based on and claims benefit of U.S. Provisional Patent Application No. 63/123,074 having a filing date of Dec. 9, 2020, which is incorporated by reference herein.

FIELD

The present disclosure relates generally to LIDAR systems.

BACKGROUND

LIDAR systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment. The LIDAR system also includes circuitry to measure the time-of-flight (that is, the elapsed time from emitting the laser beam to detecting the reflected laser beam). The time-of-flight measurement is used to determine the distance of the LIDAR system to the object.

SUMMARY

Aspects and advantages of embodiments of the present disclosure will be set forth in part in the following description, or may be learned from the description, or may be learned through practice of the embodiments.

In one aspect, a LIDAR assembly is provided. The LIDAR assembly includes a LIDAR unit. The LIDAR unit includes a housing defining a cavity. The LIDAR unit further includes a plurality of emitters disposed within the cavity. Each of the plurality of emitters is configured to emit a laser beam. The LIDAR assembly further includes a switchable mirror. The switchable mirror is positioned relative to the LIDAR unit such that the switchable mirror receives a plurality of laser beams exiting the housing of the LIDAR unit. The switchable mirror is configurable in at least a reflective state to direct the plurality of laser beams along a first path and a transmissive state to direct the plurality of laser beams along a second path that is different than the first path to widen a field of view of the LIDAR unit along a first axis.

In another aspect, an autonomous vehicle is provided. The autonomous vehicle includes a vehicle body and a LIDAR system. The LIDAR system includes a plurality of LIDAR assemblies. Each of the LIDAR assemblies is coupled to the vehicle body at a different location thereon. Furthermore, each of the LIDAR assemblies includes a LIDAR unit. The LIDAR unit includes a housing defining a cavity. The LIDAR unit further includes a plurality of emitters disposed within the cavity. Each of the plurality of emitters is configured to emit a laser beam. The LIDAR assembly further includes a switchable mirror. The switchable mirror is positioned relative to the LIDAR unit such that the switchable mirror receives a plurality of laser beams exiting the housing of the LIDAR unit. The switchable mirror is configurable in at least a reflective state to direct the plurality of laser beams along a first path and a transmissive state to direct the plurality of laser beams along a second path that is different than the first path to widen a field of view of the LIDAR unit along a first axis.

In yet another aspect, a LIDAR assembly is provided. The LIDAR assembly includes a first LIDAR unit and a second LIDAR unit. The first LIDAR unit and the second LIDAR unit each include a housing defining a cavity. The first LIDAR unit and the second LIDAR unit each further includes a plurality of emitters disposed within the cavity. Each of the plurality of emitters is configured to emit a laser beam. The LIDAR assembly includes a first switchable mirror. The first switchable mirror is positioned relative to the first LIDAR unit such that the first switchable mirror receives a first plurality of laser beams exiting the housing of the first LIDAR unit. The first switchable mirror is configurable in at least a reflective state to direct the first plurality of laser beams along a first path and a transmissive state to direct the first plurality of laser beams along a second path that is different than the first path to widen a field of view of the first LIDAR unit along a first axis. The LIDAR assembly further includes a second switchable mirror. The second switchable mirror is positioned relative to the second LIDAR unit such that the second switchable mirror receives a second plurality of laser beams exiting the housing of the second LIDAR unit. The second switchable mirror is configurable in at least the reflective state to direct the second plurality of laser beams along a third path and the transmissive state to direct the second plurality of laser beams along a fourth path that is different than the third path to widen a field of view of the second LIDAR unit along the first axis.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
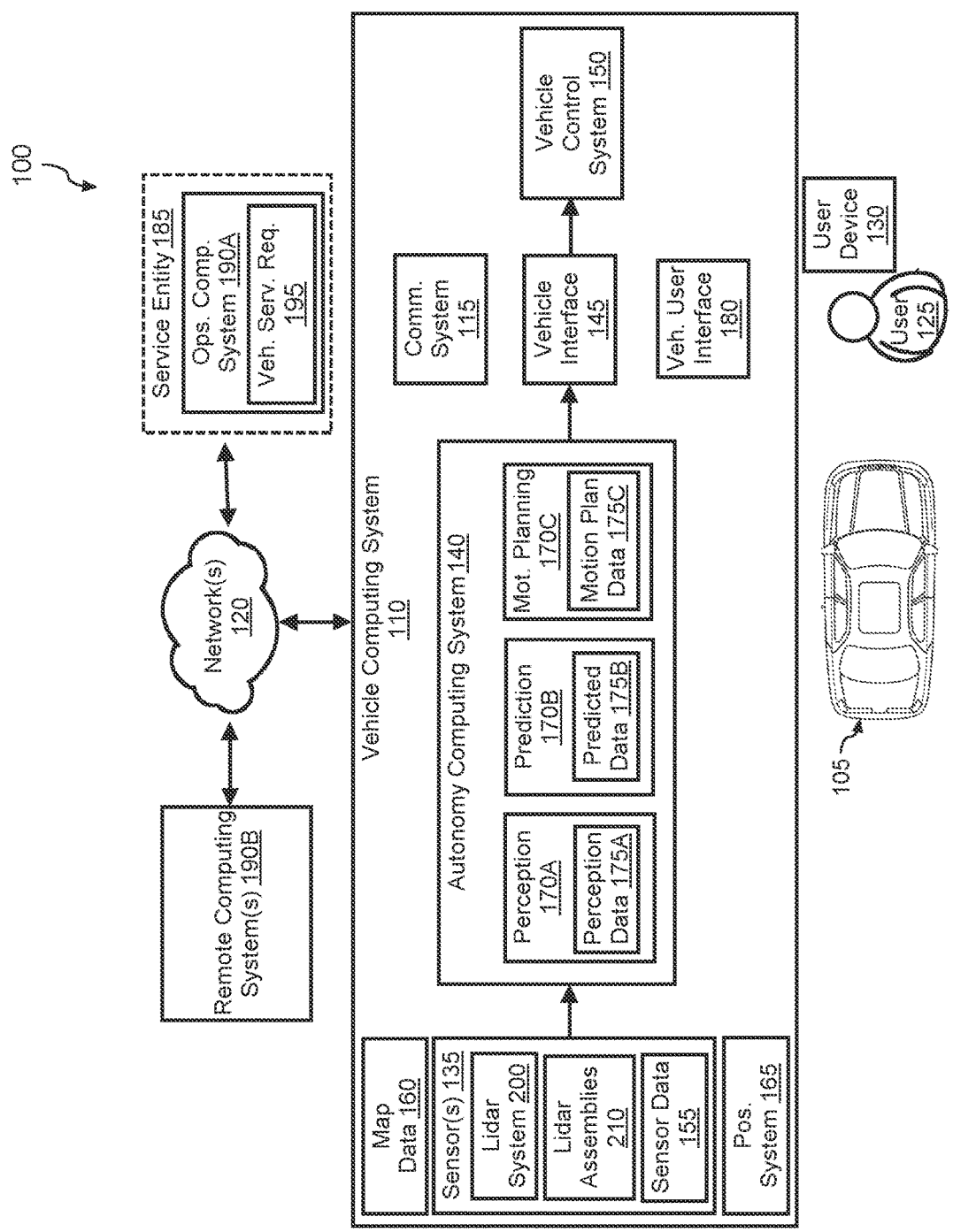
FIG. 1 depicts a block diagram of an example system for controlling the computational functions of an autonomous vehicle according to example embodiments of the present disclosure.

Example aspects of the present disclosure are directed to a light detection and ranging (LIDAR) system. The LIDAR system can include a plurality of LIDAR assemblies. Each of the LIDAR assemblies can include a LIDAR unit. The LIDAR unit can include a housing defining a cavity. The LIDAR unit can further include a plurality of emitters disposed within the cavity. Each of the plurality of emitters can be configured to emit a laser beam. Furthermore, each of the LIDAR assemblies can include a switchable mirror positioned relative to the LIDAR unit such that a plurality of laser beams exiting the housing of the LIDAR unit are directed towards the switchable mirror. As will be discussed below, the switchable mirror can be configured in at least a reflective state and a transmissive state to direct the plurality of laser beams along different paths to widen a field of view of the LIDAR unit along a first axis.

In some implementations, the switchable mirror can include a plurality of pixels. Each of the pixels can be configurable in at least the reflective state and the transmissive state. When the plurality of pixels are configured in the reflective state, the switchable mirror can reflect the plurality of laser beams to direct the plurality of laser beams along a first path. Conversely, when the plurality of pixels are configured in the transmissive state, the switchable mirror can transmit the plurality of laser beams to direct the plurality of laser beams along a second path that is different than the first path. In this manner, the switchable mirror can switch between the reflective state and the transmissive state to widen a field of view of the LIDAR unit along the first axis from a first field of view to a second field of view. For instance, in some implementations, the second field of view can be at least twice as wide as the first field of view.

In some implementations, each of the LIDAR assemblies can include a first rotating mirror and a second rotating mirror. The first rotating mirror and the second rotating mirror can each be configured to rotate about a second axis that is substantially perpendicular (e.g., less than a 15 degree difference, less than a 10 degree difference, less than a 5 degree difference, less than a 1 degree difference, etc.) to the first axis. Furthermore, in some implementations, the first rotating mirror and the second rotating mirror can each be configured to rotate at substantially the same speed. For instance, in some implementations, the first rotating mirror and the second rotating mirror can each be configured to rotate at a rotational speed ranging from about 500 revolutions per minute to about 700 revolutions per minute. In alternative implementations, the first rotating mirror and the second rotating mirror can be configured to rotate at different speeds relative to one another. For instance, the first rotating mirror can rotate at a first rotational speed, whereas the second rotating mirror can rotate at a second rotational speed that is different (e.g., faster or slower) than the first rotational speed.

In some implementations, the first rotating mirror and the second rotating mirror can each include a plurality of optics. For instance, in some implementations, the first rotating mirror and the second rotating mirror can each include three separate optics. In alternative implementations, the first rotating mirror and the second rotating mirror can include more or fewer optics.

The first rotating mirror can be positioned along the first path. In this manner, the plurality of laser beams reflecting off the switchable mirror when the switchable mirror is configured in the reflective state can be directed onto the first rotating mirror. Furthermore, the first rotating mirror can reflect the plurality of laser beams to direct the plurality of laser beams into an environment surrounding the corresponding LIDAR assembly.

In some implementations, each of the LIDAR assemblies can include a stationary mirror positioned along the second path. In this manner, the stationary mirror can receive the plurality of laser beams via the switchable mirror when the switchable mirror is configured in the transmissive state. Furthermore, the stationary mirror can be positioned relative to the second rotating mirror such that the plurality of laser beams can reflect off of the stationary mirror as a plurality of reflected laser beams directed towards the second rotating mirror. Still further, the second rotating mirror can reflect the plurality of laser beams to direct the plurality of laser beams into the environment surrounding the corresponding LIDAR assembly.

In some implementations, the plurality of emitters disposed within the cavity defined by the housing of the LIDAR unit can include a first plurality of emitters and a second plurality of emitters. Each of the first plurality of emitters can be configured to emit a first laser beam having a first wavelength. Conversely, each of the second plurality of emitters can be configured to emit a second laser beam having a second wavelength that is different than the first wavelength. For instance, in some implementations, the first wavelength ranges from 800 nanometers to 880 nanometers, and the second wavelength ranges from 890 nanometers to 930 nanometers. As will be discussed below, in such implementations, the first rotating mirror and the second rotating mirror can be configured to widen a field of view of the LIDAR unit along a second axis (e.g., vertical axis) thereof that is substantially perpendicular to the first axis (e.g., horizontal axis).

In some implementations, the first rotating mirror and the second rotating mirror can each include a plurality of dichroic optics. Each of the dichroic optics can be configured to optically act on the first laser beam and the second laser beam in a different manner to widen a field of view of the LIDAR unit along the second axis. For instance, in some implementations, each of the dichroic optics can include a beam splitter and a mirror. For instance, a first surface of the dichroic optic can be coated with a dichroic beam splitter coating. In this manner, the first surface of the dichroic optic can be configured as the beam splitter. Conversely, a second surface of the dichroic optic can be coated with a reflective material. In this manner, the second surface of the dichroic optic can be configured as the mirror.

The beam splitter (e.g., first surface of dichroic optic) can be configured to transmit laser beams of the first wavelength. In this manner, the beam splitter can be configured to transmit the first laser beam emitted from each of the first plurality of emitters of the LIDAR unit. For instance, the first laser beam emitted from each of the first plurality of emitters can pass through the first surface of the dichroic optic and reflect off of the second surface (e.g., mirror) of the dichroic optic in a first direction as a reflected first laser beam extending above a third axis that is substantially perpendicular (e.g., less than a 15 degree difference, less than a 10 degree difference, less than a 5 degree difference, less than a 1 degree difference, etc.) to the first axis and the second axis. The beam splitter can be further configured to reflect laser beams of the second wavelength. In this manner, the second laser beam emitted from each of the second plurality of emitters of the LIDAR unit can reflect off the first surface of the dichroic optic in a second direction as a reflected second laser beam extending below the third axis.

It should be understood that directing the reflected first laser beam and the reflected second laser beam in the first direction and the second direction, respectively, can widen the field of view of the LIDAR unit along the second axis (e.g., vertical axis). For instance, in some implementations, the optic can widen the field of view of the LIDAR unit along a second axis (e.g., vertical axis) from a first field of view to a second field of view. In some implementations, the second field of view be at least twice as wide as the first field of view. For instance, in some implementations, the second field of view can range from 20 degrees to 40 degrees.

The reflected first laser beam and the reflected second laser beam can each be angled relative to the first axis. For instance, a first angle can be defined between the first axis and the reflected first laser beam extending above the first axis. Furthermore, a second angle can be defined between the first axis and the reflected second laser beam extending below the first axis. In some implementations, the magnitude of the second angle defined between the first axis and the reflected second laser beam can be substantially the same (e.g. within about 10 degrees, within about 5 degrees, within about 1 degree, etc.) as the magnitude of the first angle defined between the first axis and the reflected first laser beam. For instance, in some implementations, the magnitude of the first angle and the magnitude of the second angle can each be about 12 degrees. In alternative implementations, the magnitude of the second angle can be different (e.g., smaller, larger) than the magnitude of the first angle.

In some implementations, one or more of the LIDAR assemblies can include a first LIDAR unit and a second LIDAR unit. The first LIDAR unit and the second LIDAR unit can each be configured in substantially the same manner as the LIDAR unit discussed above. The first LIDAR unit can be associated with sensing objects in a first field (e.g., midrange). Conversely, the second LIDAR unit can be associated with sensing objects in a second field (e.g., long range) that is different than the first field.

The one or more LIDAR assemblies can include a first switchable mirror. The first switchable mirror can be positioned relative to the first LIDAR unit such that the first switchable mirror receives a first plurality of laser beams exiting the housing of the first LIDAR unit. Furthermore, the first switchable mirror can be configurable in at least the reflective state to direct the plurality of laser beams along a first path and the transmissive state to direct the first plurality of laser beams along a second path that is different than the first path to widen a field of view of the first LIDAR unit along the first axis from a first field of view to a second field of view. In some implementations, the second field of view can be at least twice as wide as the first field of view. For instance, in some implementations, the second field of view can range from 90 degrees to 130 degrees.

The one or more LIDAR assemblies can include the first rotatable mirror and the second rotatable mirror. The first rotatable mirror can be positioned along the first path. In addition, the one or more LIDAR assemblies can include a first stationary mirror positioned along the second path. In this manner, the first stationary mirror can receive the first plurality of laser beams via the first switchable mirror when the first switchable mirror is configured in the transmissive state. Furthermore, the first stationary mirror can be positioned relative to the second rotating mirror such that the first plurality of laser beams can reflect off of the first stationary mirror as a plurality of reflected laser beams directed towards the second rotating mirror.

The one or more LIDAR assemblies can further include a second switchable mirror. The second switchable mirror can be positioned relative to the second LIDAR unit such that the second switchable mirror receives a second plurality of laser beams exiting the housing the second LIDAR unit. Furthermore, the second switchable mirror can be configurable in at least the reflective state to direct the second plurality of laser beams along a third path and the transmissive state to direct the second plurality of laser beams along a fourth path that is different than the third path to widen a field of view of the second LIDAR unit along the first axis from a first field of view to a second field of view. In some implementations, the second field of view can be at least twice as wide as the first field of view. For instance, in some implementations, the second field of view can range from about 40 degrees to about 70 degrees.

The one or more LIDAR assemblies can include a third rotatable mirror and a fourth rotatable mirror. The third rotatable mirror can be positioned along the third path. In addition, the one or more LIDAR assemblies can include a second stationary mirror positioned along the fourth path. In this manner, the second stationary mirror can receive the second plurality of laser beams via the second switchable mirror when the second switchable mirror is configured in the transmissive state. Furthermore, the second stationary mirror can be positioned relative to the fourth rotating mirror such that the second plurality of laser beams can reflect off of the second stationary mirror as a plurality of reflected laser beams directed towards the fourth rotating mirror.

In some implementations, the LIDAR system according to example aspects of the present disclosure can be implemented onboard an autonomous vehicle (e.g., ground-based vehicle, aerial vehicle, etc.). The autonomous vehicle can include various systems and devices configured to control the operation of the autonomous vehicle. For example, the autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., LIDAR system as described herein, cameras, RADAR, etc.), attempt to comprehend the vehicle's surrounding environment by performing various processing techniques on the sensor data, and generate an appropriate motion plan through the vehicle's surrounding environment. This can include, for example, detecting of object(s) (e.g., pedestrians, vehicles, bicycles/bicyclists, etc.) within the vehicle's surrounding environment, predicting the future motion trajectory of those objects, and planning the vehicle's motion to avoid interference with the object(s). Moreover, the autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicle can be configured to operate in one or more modes including, for example, a fully autonomous operating mode, a semi-autonomous operating mode, and a manual operating mode. The fully autonomous (e.g., self-driving) operating mode can be one in which the autonomous vehicle can provide driving and navigational operation with minimal and/or no interaction from a human driver present in the autonomous vehicle. The semi-autonomous operating mode can be one in which the vehicle can operate with some interaction from a human driver present in the vehicle. The manual operating mode can be one in which a human driver present in the autonomous vehicle manually controls (e.g., acceleration, braking, steering) the autonomous vehicle via one or more input devices (e.g., steering device) of the autonomous vehicle.

The LIDAR system can be implemented on the autonomous vehicle to obtain data associated with the surrounding environment in which the autonomous vehicle is operating (e.g., while online with service entity, performing a vehicle service, etc.). For instance, each of the LIDAR assemblies can be coupled to a vehicle body (e.g., frame, panels, etc.) of the autonomous vehicle. In some implementations, the LIDAR system can include a first LIDAR assembly, a second LIDAR assembly, a third LIDAR assembly, and a fourth LIDAR assembly. The first LIDAR assembly and the second LIDAR assembly can be coupled to a front bumper of the vehicle body and a rear bumper of the vehicle body, respectively. Furthermore, the third LIDAR assembly and the fourth LIDAR assembly can be coupled to opposing sides of the vehicle body. One of ordinary skill in the art would understand that other positions on and/or within the vehicle are possible.

An autonomous vehicle can utilize the described LIDAR system to account for object(s) within a field-of view of the LIDAR system. For instance, an autonomous vehicle (e.g., its onboard computing system) can obtain sensor data via the LIDAR system. The sensor data can be indicative of an object within the field-of-view of the LIDAR system. The autonomous vehicle can determine perception data for the object within the field-of-view of the LIDAR system based at least in part on the sensor data. The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information. In some implementations, the sensor data (e.g., LIDAR data, etc.) acquired via the LIDAR system described herein can be fused with other types of sensor data (e.g., to help perceive an object at various distances, with various features, etc.).

The autonomous vehicle can determine future location(s) of the object based at least in part on the perception data. For example, the autonomous vehicle can generate a trajectory (e.g., including one or more waypoints) that is indicative of a predicted future motion of the object, given the object's heading, velocity, type, etc. over current/previous timestep(s). The autonomous vehicle can determine an action for the autonomous vehicle based at least in part on the detected object and/or the future location(s) of the object (e.g., within the field-of-view of the LIDAR system). For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

A LIDAR system according to example embodiments of the present disclosure can provide numerous technical effects and benefits. For instance, the switchable mirror configurable in at least the reflective state and the transmissive state can direct the plurality of laser beams exiting the housing of the LIDAR unit along different paths (e.g., first path and second path) to widen a field of view of the LIDAR unit along the first axis (e.g., horizontal axis). This can be advantageous when the LIDAR assembly is implemented on an autonomous vehicle, because the LIDAR unit can have a widened field of view due, at least in part, to the switchable mirror. This can allow for improved sensing capabilities of the autonomous vehicle, which can lead to better object perception, motion prediction, and motion planning. Ultimately, this can improve the overall efficiency of the vehicle's autonomous operations (e.g., by increasing computational confidence) and its performance.

Referring now to the FIGS., FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 110 can be located onboard the vehicle 105 (e.g., it can be included on and/or within the vehicle 105).

The vehicle 105 incorporating the vehicle computing system 110 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception function 170A, prediction function 170B, and motion planning function 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 155 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170B, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The vehicle service request 195 can indicate a type/size/class of vehicle such as, for example, a sedan, an SUV, luxury vehicle, standard vehicle, etc. The vehicle service request 195 can indicate a product of the service entity 185. For example, the vehicle service request 195 can indicate that the user is requesting a transportation pool product by which the user would potentially share the vehicle (and costs) with other users/items. In some implementations, the vehicle service request 195 can explicitly request for the vehicle service to be provided by an autonomous vehicle or a human-driven vehicle. In some implementations, the vehicle service request 195 can indicate a number of users that will be riding in the vehicle/utilizing the vehicle service. In some implementations, the vehicle service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
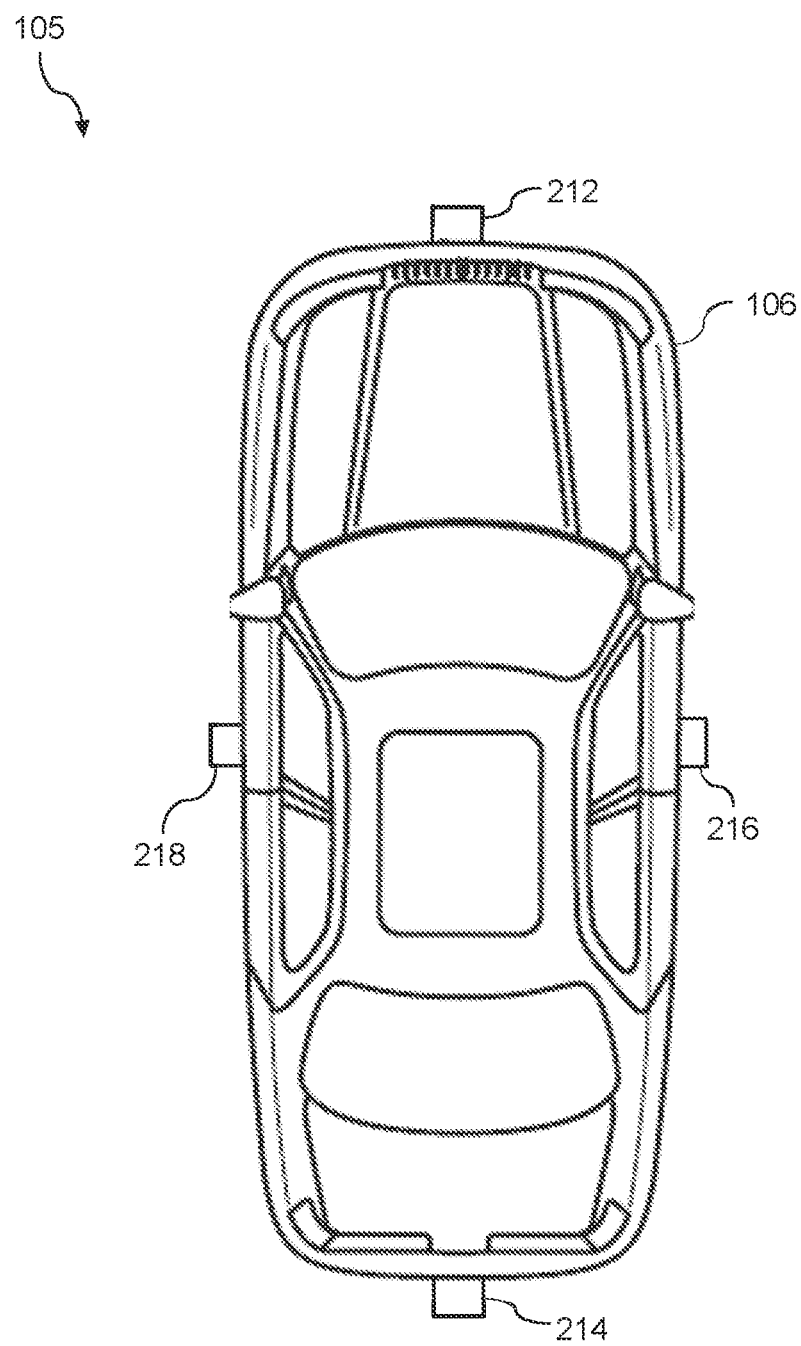
FIG. 2 depicts LIDAR assemblies of a LIDAR system coupled to a vehicle body of an autonomous vehicle according to example embodiments of the present disclosure.

Referring now to FIGS. 1 and 2, a LIDAR system 200 for the vehicle 105 can be included as part of the sensors 135. As shown, the LIDAR system 200 can include a plurality of LIDAR assemblies 210. Each of the LIDAR assemblies 210 can be coupled to a vehicle body 106 of the vehicle 105. In some implementations, the LIDAR system 200 can include a first LIDAR assembly 212, a second LIDAR assembly 214, a third LIDAR assembly 216, and a fourth LIDAR assembly 218. In alternative implementations, the LIDAR system 200 can include more or fewer LIDAR assemblies 210.

Each of the LIDAR assemblies 210 can be coupled to the vehicle body 106 at different locations thereon. For instance, the first LIDAR assembly 212 and the second LIDAR assembly 214 can be coupled to opposing ends of the vehicle body 106. For instance, the first LIDAR assembly 212 can be removably coupled to a front bumper of the vehicle body 106. Conversely, the second LIDAR assembly 214 can be removably coupled to a rear bumper of the vehicle body 106. Furthermore, the third LIDAR assembly 216 and the fourth LIDAR assembly 218 can be coupled to opposing sides of the vehicle body 106. For instance, the third LIDAR assembly 216 can be removably coupled to a first side of the vehicle body 106. Conversely, the fourth LIDAR assembly 218 can be removably coupled to a second side of the vehicle body 106 that is opposite the first side thereof.

Figure 3:
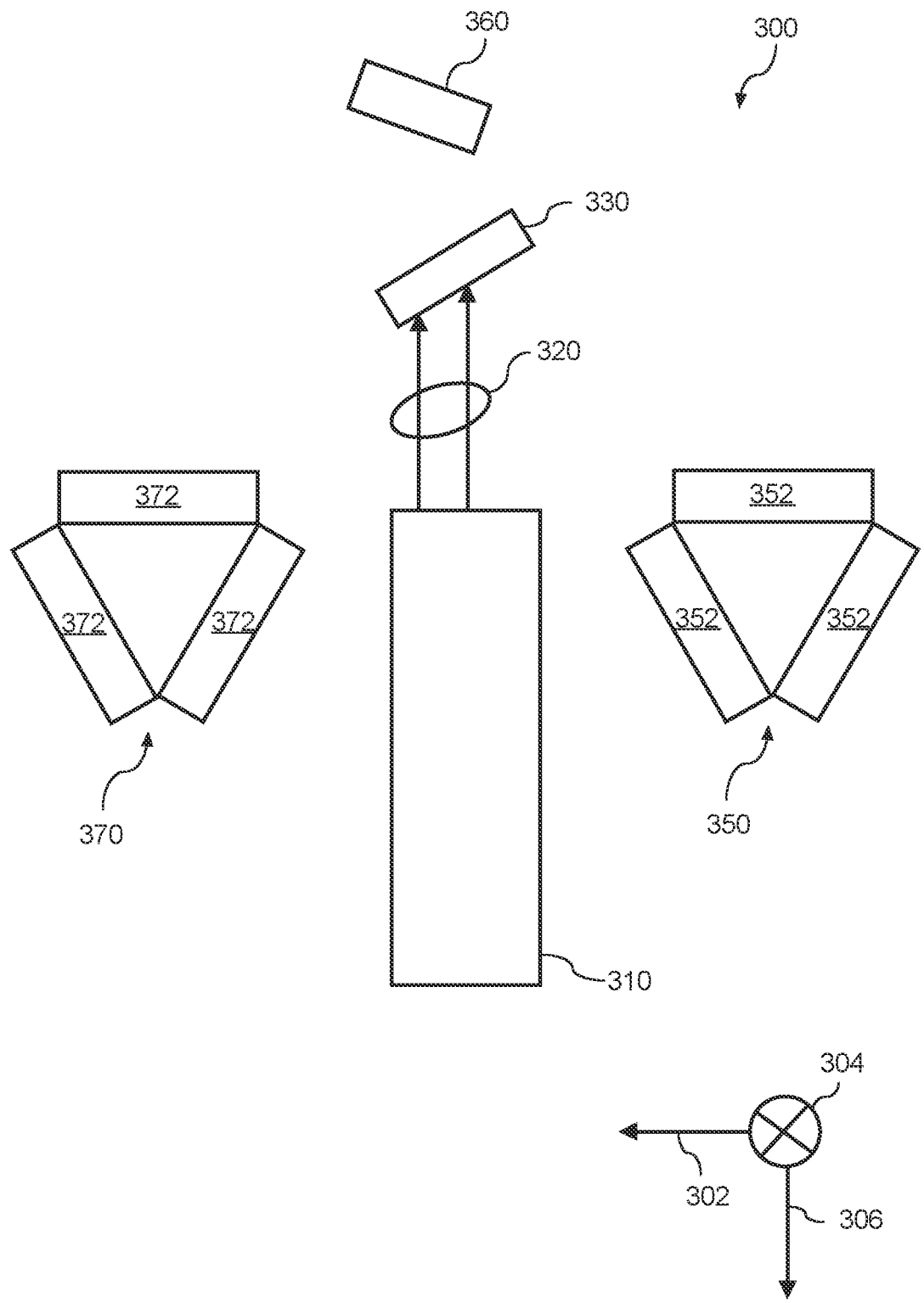
FIG. 3 depicts a LIDAR assembly of a LIDAR system according to example embodiments of the present disclosure.
Figure 4:
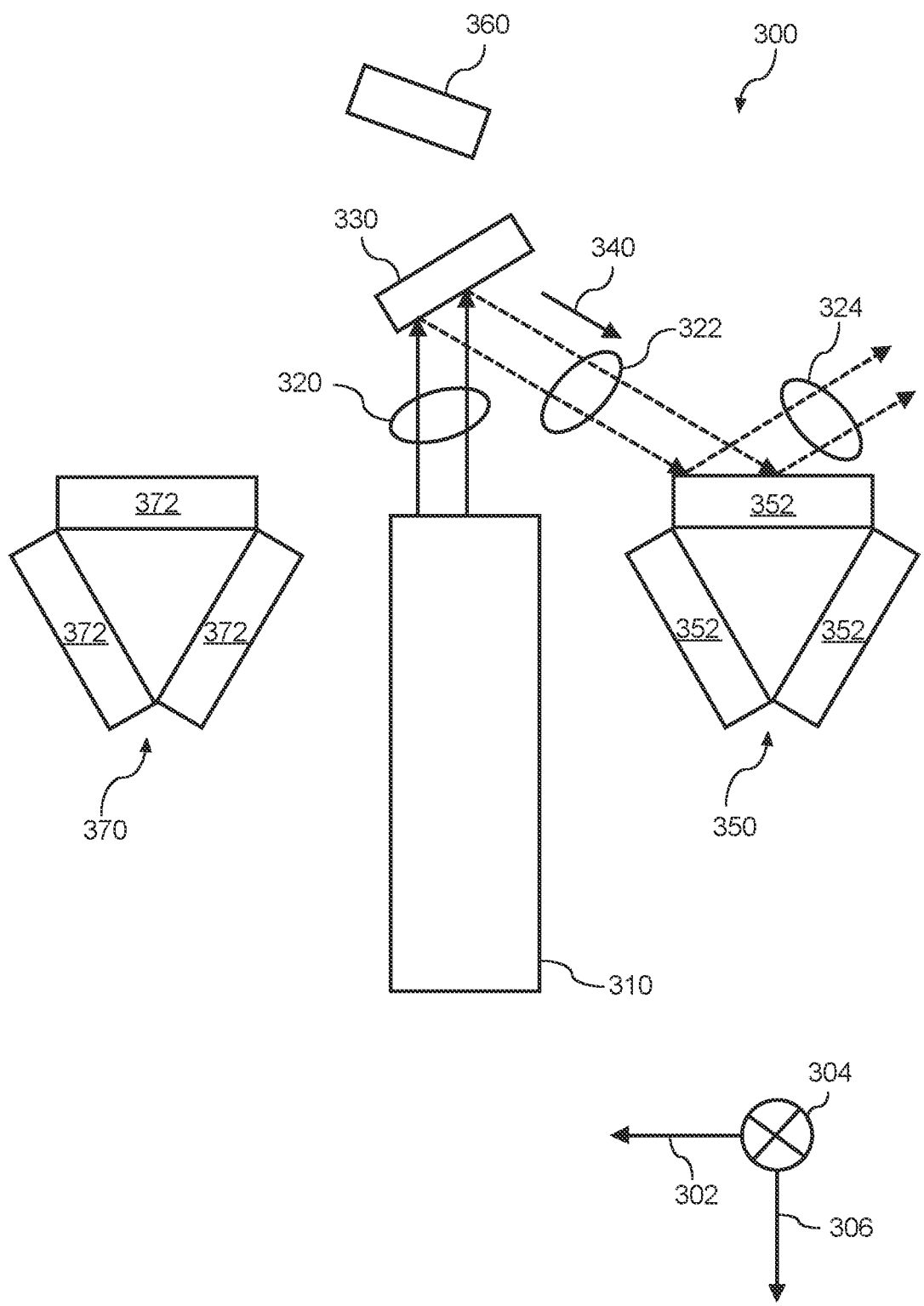
FIG. 4 depicts a top view of the LIDAR assembly of FIG. 3 when a switchable mirror of the LIDAR assembly is configured in a reflective state according to example embodiments of the present disclosure.
Figure 5:
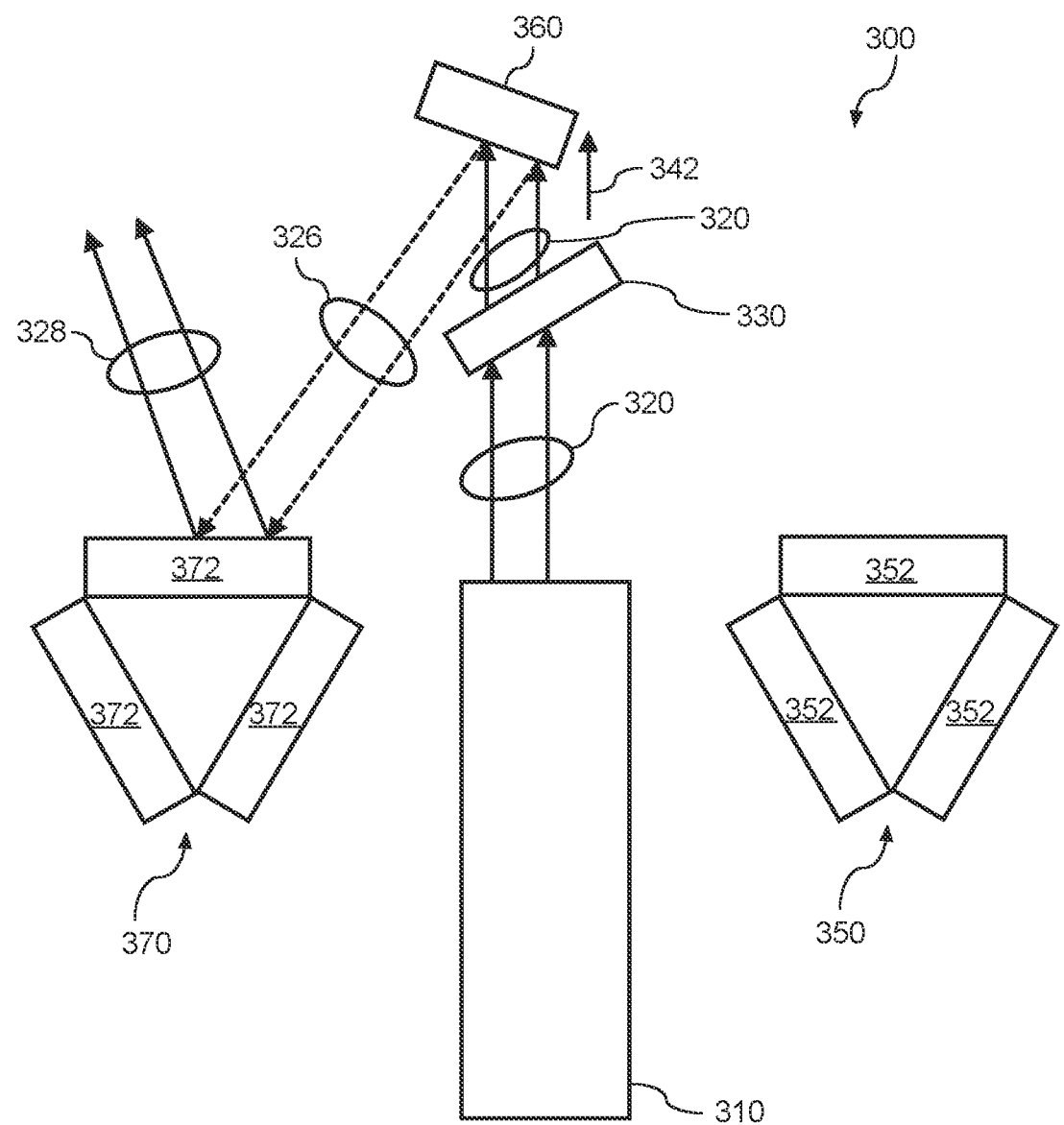
FIG. 5 depicts a top view of the LIDAR assembly of FIG. 3 when a switchable mirror of the LIDAR assembly is configured in a transmissive state according to example embodiments of the present disclosure.
Figure 5:
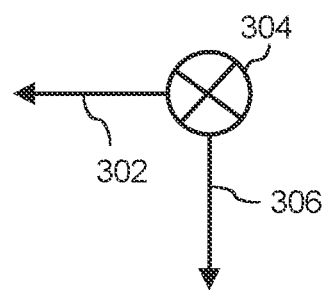

Referring now to FIGS. 3 through 5, a LIDAR assembly 300 is provided according to example embodiments of the present disclosure. It should be understood that the LIDAR assembly 300 can be implemented in the LIDAR system 200 of FIG. 2 as one of the LIDAR assemblies 210 (e.g., second LIDAR assembly 214, the third LIDAR assembly 216, or the fourth LIDAR assembly 218). The LIDAR assembly 300 can define a coordinate system that includes a first axis 302 (e.g., lateral axis), a second axis 304 (e.g., vertical axis), and a third axis 306 (e.g., longitudinal axis). The first axis 302, the second axis 304, and the third axis 306 can be substantially perpendicular (e.g., less than a 15 degree difference, less than a 10 degree difference, less than a 5 degree difference, less than a 1 degree difference, etc.) to one another.

As shown, the LIDAR assembly 300 can include a LIDAR unit 310. The LIDAR unit 310 can be configured to emit a plurality of laser beams 320. The LIDAR assembly 300 can further include a switchable mirror 330. The switchable mirror 330 can be positioned relative to the LIDAR unit 310 such that the switchable mirror 330 receives the plurality of laser beams 320. Furthermore, the switchable mirror 330 can be configurable in a reflective state (FIG. 4) to direct the plurality of laser beams 320 along a first path 340 and a transmissive state (FIG. 5) to direct the plurality of laser beams 320 along a second path 342 that is different than the first path 340 to widen a field of view of the LIDAR unit 310 along the first axis 302. For instance, in some implementations, the switchable mirror 330 can widen the field of view of the LIDAR unit 310 along the first axis 302 from a first field of view to a second field of view that is at least twice as wide as the first field of view. The second field of view can, in some implementations, range from 90 degrees to 130 degrees.

In some implementations, the switchable mirror 330 can include a plurality of pixels. A pixel can include, for example, an area of mirror. In some implementations, the state of a pixel (e.g., reflective, transparent, etc.) can change based at least in part on an applied voltage. Each of the pixels can include electrochromatic material. The electrochromatic material can be configurable in an opaque state and a translucent state. When the electrochromatic material is configured in the opaque state, the corresponding pixel can reflect the laser beams 320 emitted from the LIDAR unit 310. Conversely, the laser beams 320 emitted from the LIDAR unit 310 can at least partially pass through the corresponding pixel when the electrochromatic material is configured in the translucent state. In some implementations, the switchable mirror 330 can be configured in the reflective state when the electrochromatic material associated with each of the plurality of pixels of the switchable mirror 330 is configured in the opaque state. Furthermore, the switchable mirror 330 can be configured in the transmissive state when the electrochromatic material associated with each of the plurality of pixels of the switchable mirror 330 is configured in the translucent state.

When the switchable mirror 330 is configured in the reflective state (FIG. 4), each of the plurality of laser beams 320 can reflect off of the switchable mirror 330 as a reflected laser beam 322 directed along the first path 340. In some implementations, the LIDAR assembly 300 can include a first rotatable mirror 350 configured to rotate about the second axis 304. In some implementations, the first rotatable mirror 350 can be configured to rotate about the second axis 304 at a rotational speed ranging from 500 revolutions per minute to 700 revolutions per minute. It should be understood, however, that the first rotatable mirror 350 can be configured to rotate about the second axis 304 at any suitable speed.

As shown, the first rotatable mirror 350 can be positioned along the first path 340. In this manner, each of the plurality of laser beams 320 reflecting off of the switchable mirror 320 as a reflected laser beam 322 directed along the first path 340 can reflect off of the first rotatable mirror 350. As shown, the first rotatable mirror 350 can include a plurality of optics 352. For instance, in some implementations, the first rotatable mirror 350 can include three separate optics 352 (e.g., a first optic, a second optic, and a third optic). In alternative implementations, the first rotatable mirror 350 can include more or fewer optics 352. As shown, each of the reflected laser beams 322 can reflect off of one of the optics 352 of the first rotatable mirror 350 as a reflected laser beam 324 directed towards an environment surrounding the LIDAR assembly 300.

When the switchable mirror 330 is configured in the transmissive state (FIG. 5), the switchable mirror 330 can transmit the plurality of laser beams 320 to direct the plurality of laser beams 320 along the second path 342 that is different than the first path 340. For instance, in some implementations, the electrochromatic material associated with each of the plurality of pixels of the switchable mirror can be configured in the translucent state such that the switchable mirror 330 is transparent. In this manner, the plurality of laser beams 320 can pass through the switchable mirror 330.

In some implementations, the LIDAR assembly 300 can include a stationary mirror 360 (e.g., fold mirror) positioned along the second path 342. In this manner, each of the plurality of laser beams 320 can reflect off of the stationary mirror 360 as a reflected laser beam 326. In some implementations, the LIDAR assembly 300 can include a second rotating mirror 370. In some implementations, the second rotating mirror 370 can be configured to rotate about the second axis 304. For instance, in some implementations, the second rotatable mirror 370 can be configured rotate about the second axis 304 at a rotational speed ranging from 500 revolutions per minute to 700 revolutions. In some implementations, the second rotatable mirror 370 can rotate about the second axis 304 faster or slower than the first rotatable mirror 350 rotates about the second axis 304. In alternative implementations, the first rotatable mirror 350 and the second rotatable mirror 370 can rotate about the second axis 304 at the same speed.

The second rotatable mirror 370 can be positioned relative to the stationary mirror 360 such that the plurality of reflected laser beams 326 can reflect off of the second rotatable mirror 370. As shown, the second rotatable mirror 370 can include a plurality of optics 372. For instance, in some implementations, the second rotatable mirror 370 can include three separate optics 372 (e.g., a first optic, a second optic, and a third optic). In alternative implementations, the second rotatable mirror 370 can include more or fewer optics 372. As shown, each of the reflected laser beams 326 can reflect off of one of the optics 372 of the second rotatable mirror 370 as a reflected laser beam 328 directed towards an environment surrounding the LIDAR assembly 300.

Figure 6:
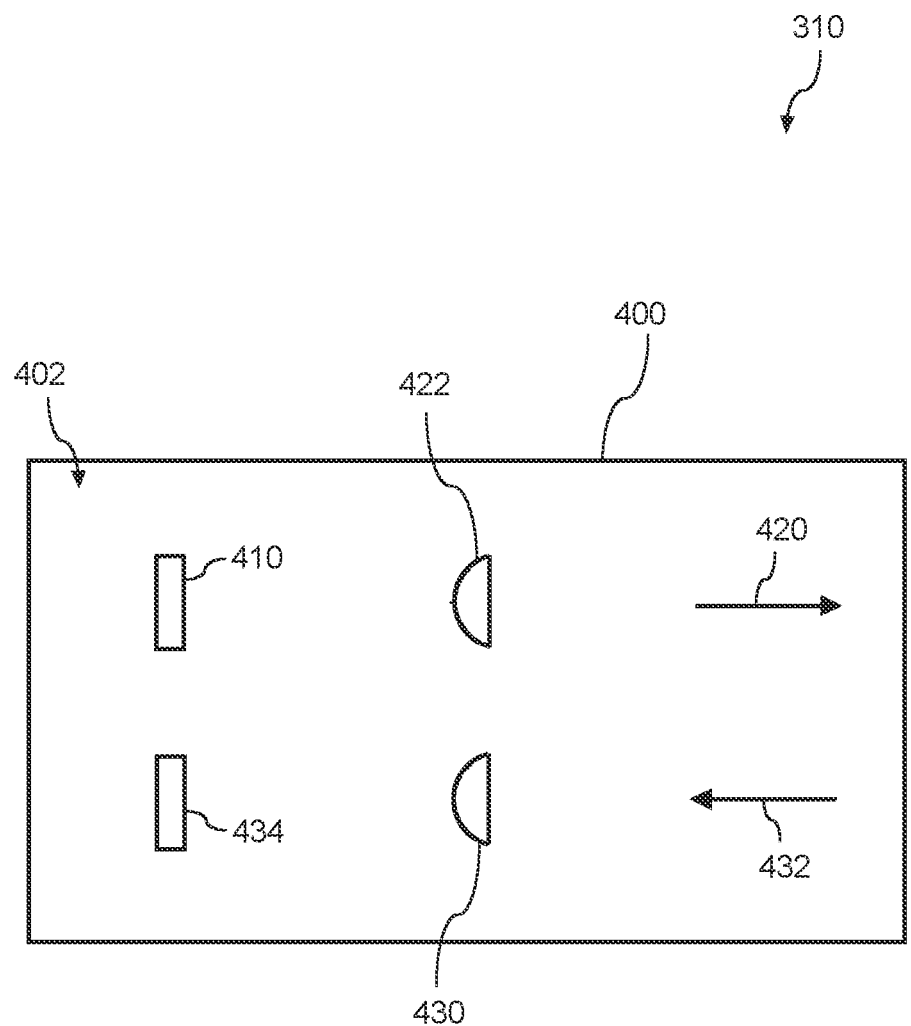
FIG. 6 depicts components of a LIDAR unit of a LIDAR assembly according to example embodiments of the present disclosure.

Referring now to FIG. 6, components of the LIDAR unit 310 are provided according to example embodiments of the present disclosure. As shown, the LIDAR unit 310 can include a housing 400 defining a cavity 402. Furthermore, the LIDAR unit 310 can include a plurality of emitters 410 (only one shown) disposed within the cavity 402. Each of the emitters 410 can be configured to emit a laser beam along a transmit path 420. The LIDAR unit 310 can include transmit optics 422 (e.g., one or more lenses) positioned along the transmit path 420. In this manner, the laser beam emitted from each of the emitters 410 can pass through the transmit optics 422 prior to exiting the cavity 402 of the housing 400 as one of the plurality of laser beams 320 discussed above with reference to FIGS. 3 through 5.

In some implementations, the LIDAR unit 310 can include receive optics 430 (e.g., one or more lenses) positioned within the cavity 402 of the housing 400. More specifically, the receive optics 430 can be positioned along a receive path 432. In this manner, a plurality of reflected laser beams entering the cavity 402 from an outside environment can pass through the receive optics 430 positioned along the receive path 432. Furthermore, the LIDAR unit 310 can include a plurality of detectors 434. Each of the plurality of detectors 434 can be configured to detect one or more of the plurality of reflected laser beams entering the cavity 402 from the outside environment.

Figure 7:
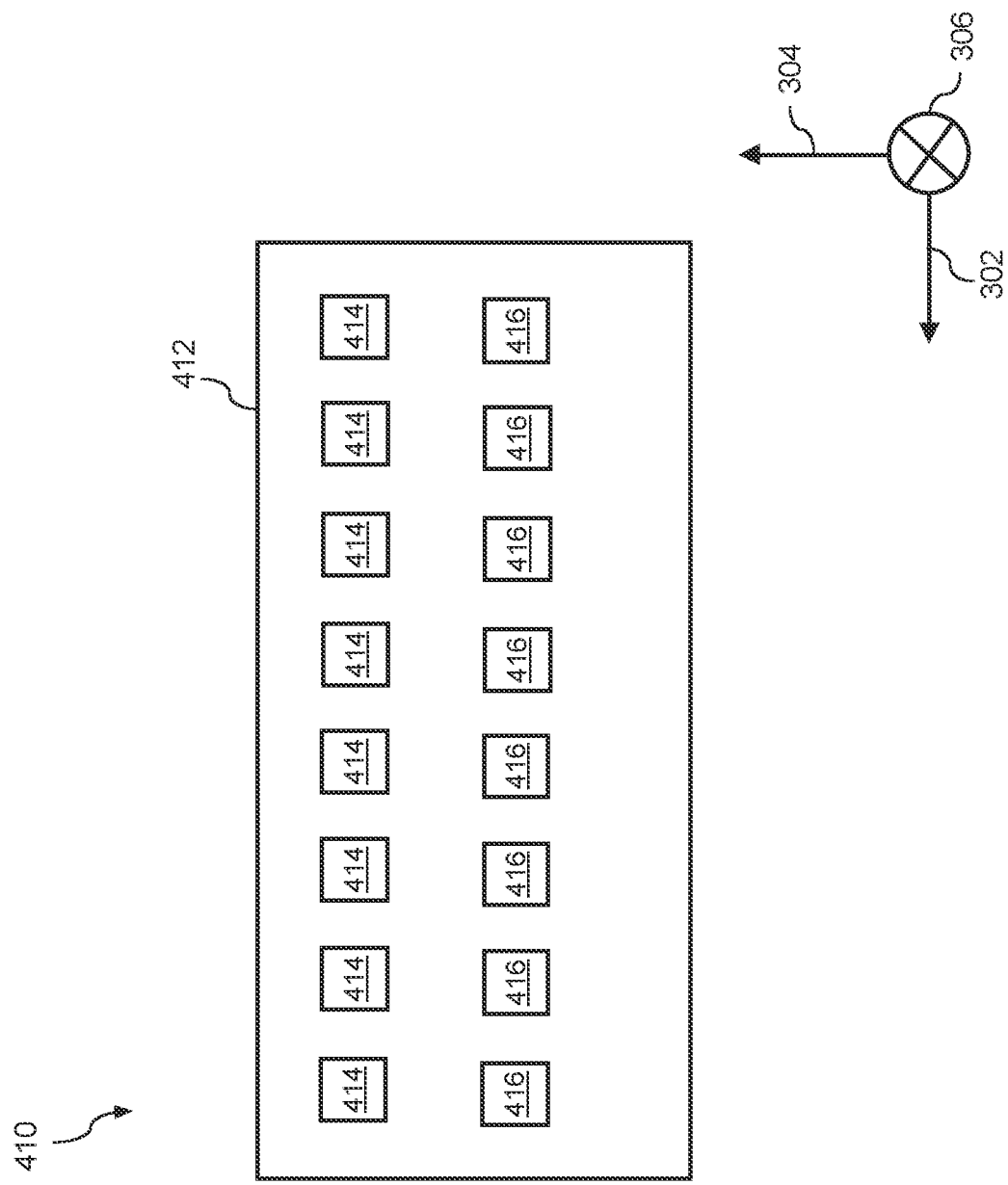
FIG. 7 depicts a circuit board of a LIDAR unit of a LIDAR assembly according to example embodiments of the present disclosure.

Referring now to FIG. 7, the plurality of emitters 410 can be disposed on a circuit board 412. In some implementations, the plurality of emitters 410 can include a first plurality of emitters 414 and a second plurality of emitters 416. As shown, the first plurality of emitters 414 can be spaced apart from the second plurality of emitters 416 on the circuit board 412. Furthermore, each of the first plurality of emitters 414 can be configured to emit a first laser beam having a first wavelength. In some implementations, the first wavelength can range from 800 nanometers to 880 nanometers. Each of the second plurality of emitters 416 can be configured to emit a second laser beam having a second wavelength that is different than the first wavelength. In some implementations, the second wavelength can range from 890 nanometers to 930 nanometers.

Figure 8:
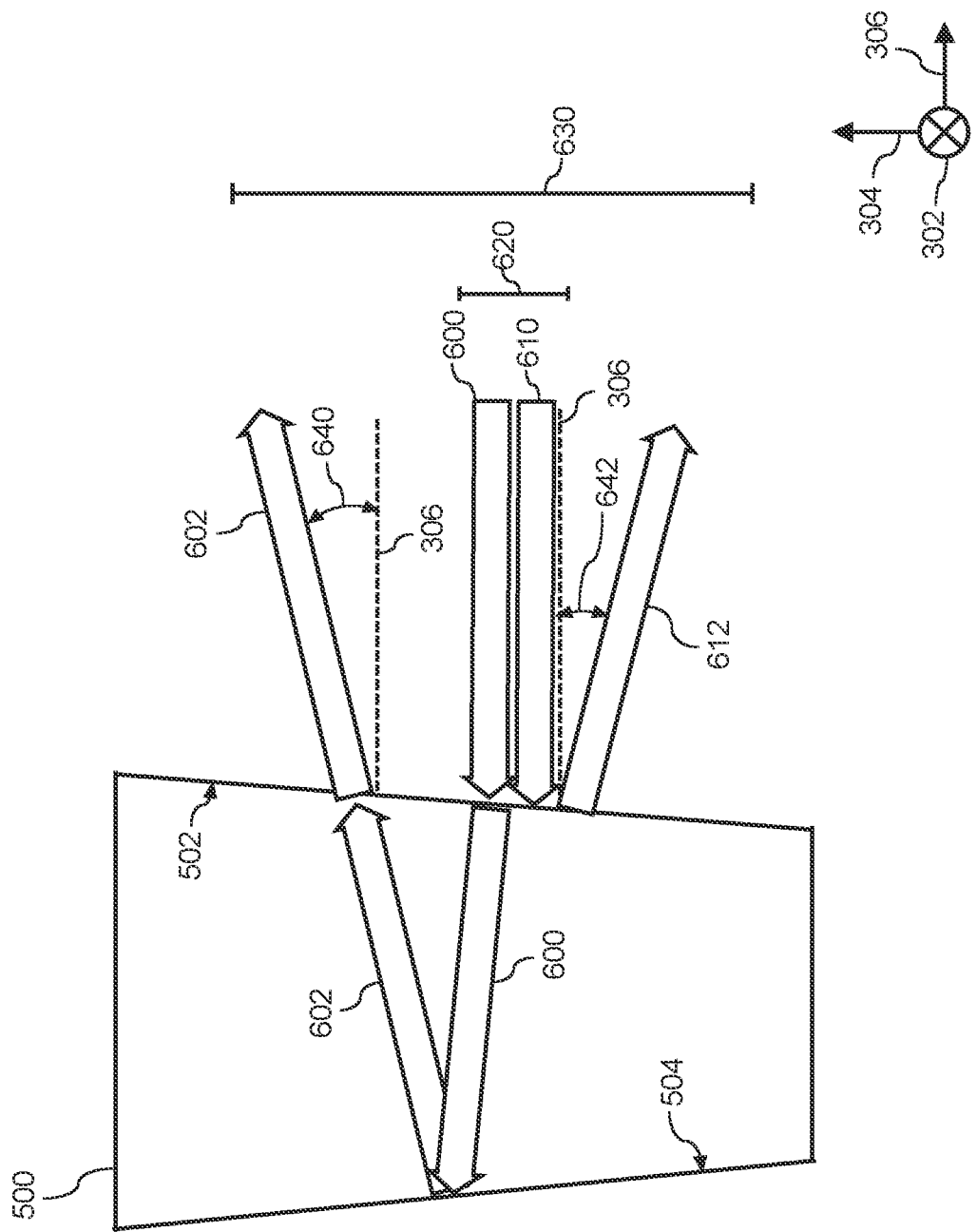
FIG. 8 depicts an optic of rotatable mirror of a LIDAR assembly according to example embodiments of the present disclosure.

Referring now to FIG. 8, a cross-sectional view of an optic 500 of a rotatable mirror (e.g., first rotatable mirror 350, second rotatable mirror 370) is provided according to example embodiments of the present disclosure. The optic 500 can be configured optically act on a plurality of first laser beams 600 having the first wavelength and a plurality of second laser beams 610 having the second wavelength in a different manner to widen a field of view of the LIDAR unit 310 (FIG. 3) along the second axis 304. In some implementations, the optic 500 can be configured as a dichroic optic. The dichroic optic can include a beam splitter and a mirror. In such implementations, a first surface 502 of the optic 500 can be coated with a dichroic beam splitter coating. In this manner, the first surface 502 of the optic 500 can be configured as the beam splitter. Conversely, a second surface 504 of the optic 500 can be coated with a reflective material. In this manner, the second surface 504 of the optic 500 can be configured as the mirror.

As shown, the first surface 502 (e.g., beam splitter) of the optic 500 can be configured to transmit the plurality of first laser beams 600 having the first wavelength. In this manner, each of the plurality of first laser beams 600 can pass through the first surface 502 of the optic 500 and reflect off of the second surface 504 (e.g., mirror) of the optic 500 in a first direction as a reflected first laser beam 602 extending above the third axis 306. Conversely, the first surface 502 (e.g., beam splitter) of the optic 500 can be configured to reflect the plurality of second laser beams 610 having the second wavelength. In this manner, each of the plurality of second laser beams 610 can reflect off of the first surface 502 of the optic 500 in a second direction as a reflected second laser beam 612 extending below the third axis.

As shown, directing the reflected first laser beams 602 and the reflected second laser beams 612 in the first direction (e.g., upward) and the second direction (e.g., downward), respectively, can widen the field of view of the LIDAR unit 310 (FIG. 3) along the second axis 304. For instance, in some implementations, the optic 500 can widen the field of view of the LIDAR unit 310 (FIG. 3) along the second axis 304 from a first field of view 620 to a second field of view 630 that is at least twice as wide as the first field of view 620. In some implementations, the second field of view 630 can range from 20 degrees to 40 degrees.

The reflected first laser beams 602 and the reflected second laser beams 612 can each be angled relative to the third axis 306. For instance, a first angle 640 can be defined between the third axis 306 and the reflected first laser beams 602 extending above the third axis 306. Furthermore, a second angle 642 can be defined between the third axis 306 and the reflected second laser beams 612 extending below the third axis 306. In some implementations, the magnitude of the second angle 642 can be substantially the same (e.g. within about 10 degrees, within about 5 degrees, within about 1 degree, etc.) as the magnitude of the first angle 640. For instance, in some implementations, the magnitude of the first angle 640 and the magnitude of the second angle 642 can each range from 8 degrees to 16 degrees.

Figure 9:
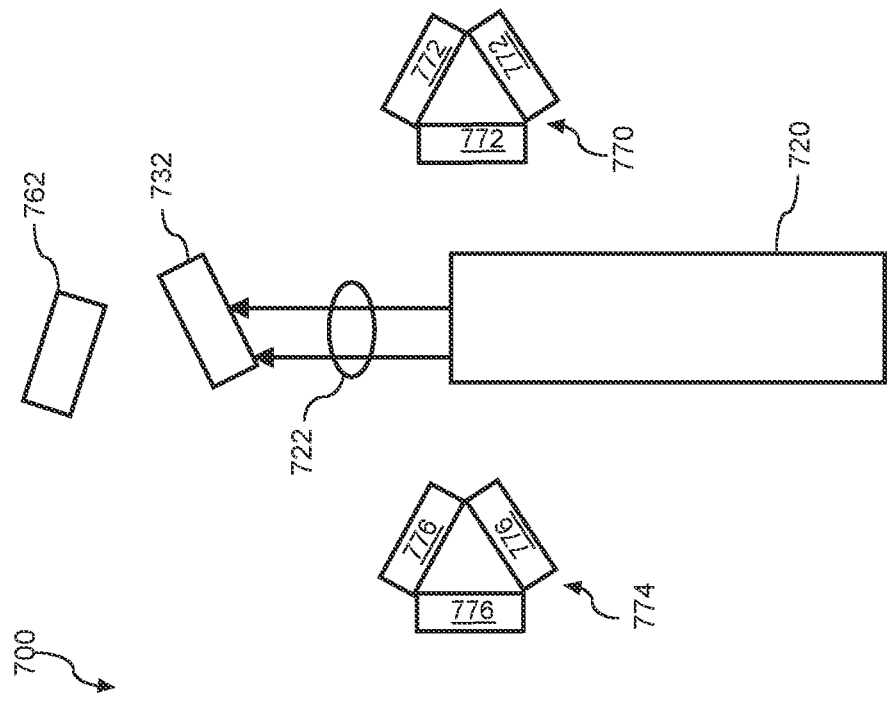
FIG. 9 depicts another LIDAR assembly according to example embodiments of the present disclosure.
Figure 9:
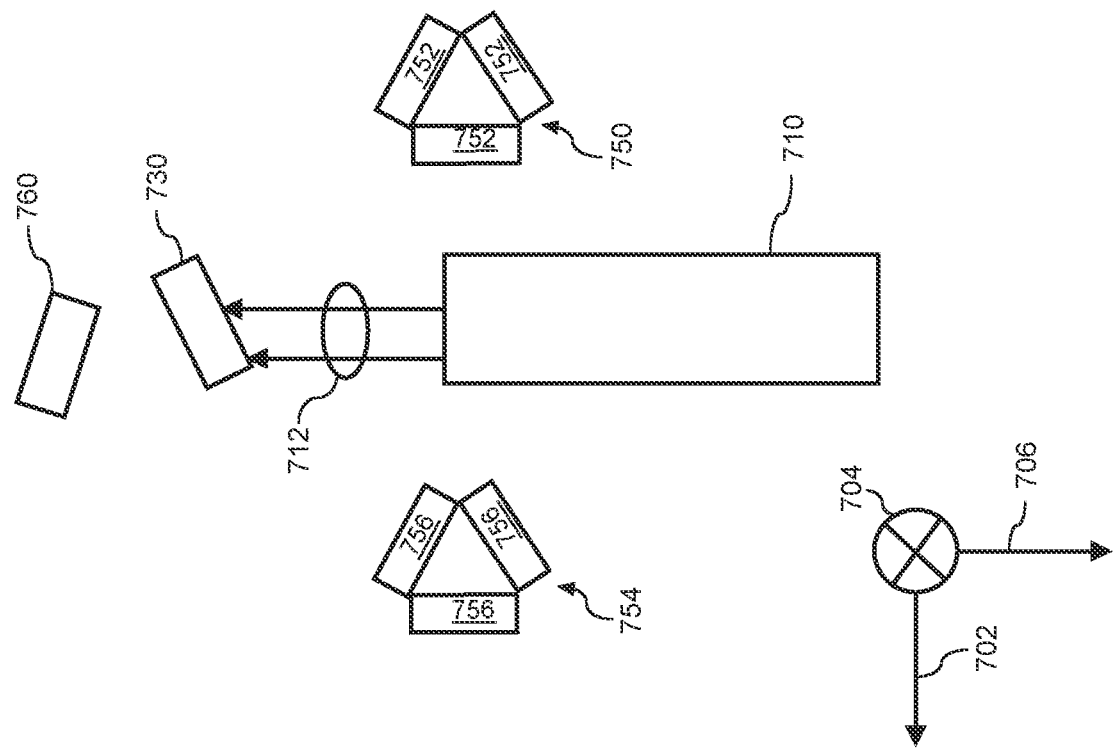
Figure 10:
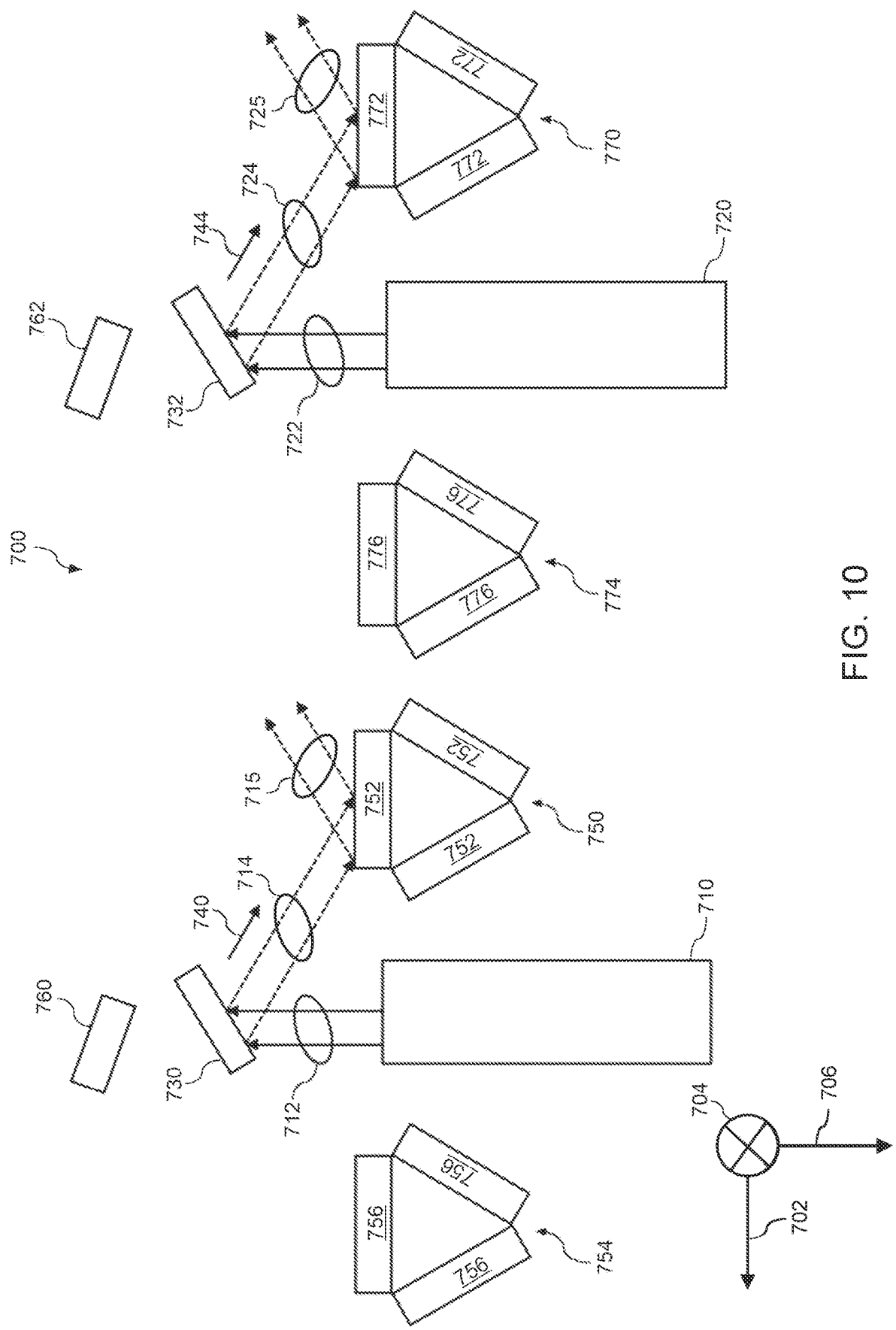
FIG. 10 depicts a top view of the LIDAR assembly of FIG. 9 when a first switchable mirror and a second switchable mirror of the LIDAR assembly are each configured in a reflective state according to example embodiments of the present disclosure.
Figure 11:
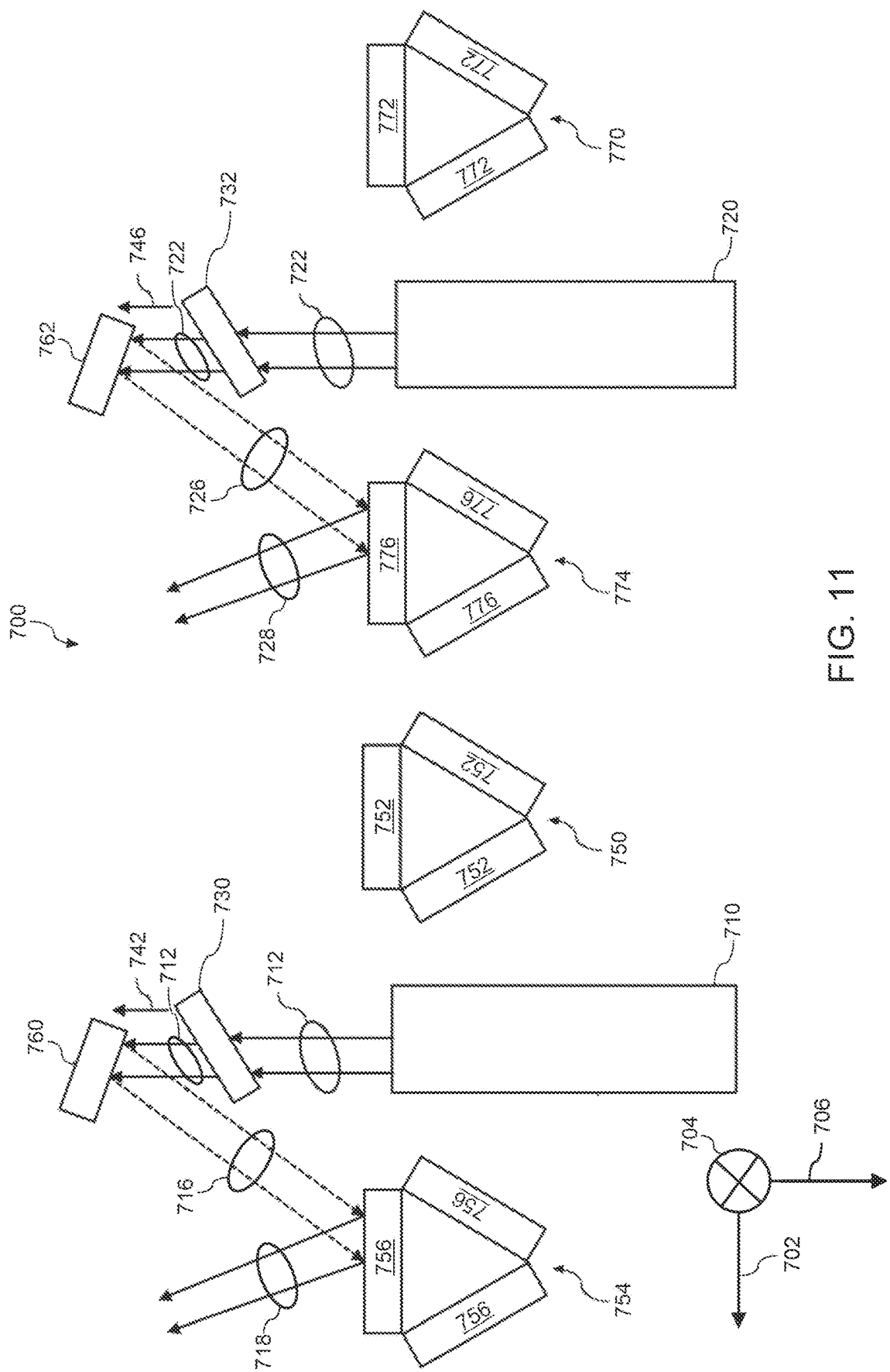
FIG. 11 depicts a top view of the LIDAR assembly of FIG. 9 when a first switchable mirror and a second switchable mirror of the LIDAR assembly are each configured in a transmissive state according to example embodiments of the present disclosure.

Referring now to FIGS. 9 through 11, another LIDAR assembly 700 is provided according to example embodiments of the present disclosure. It should be understood that the LIDAR assembly 700 can be implemented in the LIDAR system 200 of FIG. 2 as one of the LIDAR assemblies 210 (e.g., first LIDAR assembly 212). The LIDAR assembly 700 can define a coordinate system that includes a first axis 702 (e.g., horizontal axis), a second axis 704 (e.g., vertical axis), and a third axis 706 (e.g., longitudinal axis). The first axis 702, the second axis 704, and the third axis 706 can be substantially perpendicular e.g., less than a 15 degree difference, less than a 10 degree difference, less than a 5 degree difference, less than a 1 degree difference, etc.) to one another.

As shown, the LIDAR assembly 700 can include a first LIDAR unit 710 and a second LIDAR unit 720. The first LIDAR unit 710 can be associated with sensing objects in a first field (e.g., midrange). Conversely, the second LIDAR unit 720 can be associated with sensing objects in a second field (e.g., long range) that is different than the first field. For instance, the second field can be located farther from the LIDAR assembly 700 than the first field.

The first LIDAR unit 710 can be configured in the same manner as the LIDAR unit 310 of the LIDAR assembly 300 discussed above with reference to FIGS. 6 and 7. Furthermore, the second LIDAR unit 720 can be configured in substantially the same manner as the first LIDAR unit 710. However, a size of the transmit optics 422 (FIG. 6) included in the second LIDAR unit 720 can be different (e.g., larger) than a size of the transmit optics 422 included in the first LIDAR unit 710. It should be understood that the difference in the size of the transmit optics 422 is due, at least in part, to the second LIDAR unit 720 being configured to sense objects in the second field (e.g., long range) that is farther from the LIDAR assembly 700 than the first field (e.g., midrange).

The LIDAR assembly 700 can include a first switchable mirror 730 and a second switchable mirror 732. The first switchable mirror 730 can be positioned relative to the first LIDAR unit 710 such that the first switchable mirror 730 receives a first plurality of laser beams 712 emitted from the first LIDAR unit 710. The second switchable mirror 732 can be positioned relative to the second LIDAR unit 720 such that the second switchable mirror receives a second plurality of laser beams 722 emitted from the second LIDAR unit 720. The first switchable mirror 730 can be configurable in a reflective state (FIG. 10) to direct the first plurality of laser beams 712 along a first path 740 and a transmissive state (FIG. 11) to direct the first plurality of laser beams 712 along a second path 742 that is different than the first path 740 to widen a field of view of the first LIDAR unit 710 along the first axis 702. Furthermore, the second switchable mirror 732 can be configurable in the reflective state (FIG. 10) to direct the second plurality of laser beams 722 along a third path 744 and a transmissive state (FIG. 11) to direct the second plurality of laser beams 722 along a fourth path 746 that is different than the third path 744 to widen a field of view of the second LIDAR unit 720 along the first axis 702.

In some implementations, the first switchable mirror 730 and the second switchable mirror 732 can each include a plurality of pixels. Each of the pixels can include electrochromatic material. The electrochromatic material can be configurable in an opaque state and a translucent state. When the electrochromatic material is configured in the opaque state, the corresponding pixel can reflect laser beams (e.g., first plurality of laser beams 712, second plurality of laser beams 722). Conversely, laser beams can at least partially pass through the corresponding pixel when the electrochromatic material is configured in the translucent state. In some implementations, the switchable mirror 730, 732 can be configured in the reflective state when the electrochromatic material associated with each of the plurality of pixels of the switchable mirror 730, 732 is configured in the opaque state. Furthermore, the switchable mirror 730, 732 can be configured in the transmissive state when the electrochromatic material associated with each of the plurality of pixels of the switchable mirror 730, 732 is configured in the translucent state.

When the first switchable mirror 730 is configured in the reflective state (FIG. 10), each of the plurality of first laser beams 712 can reflect off of the first switchable mirror 730 as a reflected laser beam 714 directed along the first path 740. In some implementations, the LIDAR assembly 700 can include a first rotatable mirror 750 configured to rotate about the second axis 704. The first rotatable mirror 750 can, in some implementations, be configured to rotate about the second axis 704 at a rotational speed ranging from 500 revolutions per minute to 700 revolutions per minute. It should be understood, however, that the first rotatable mirror 750 can be configured to rotate about the second axis 704 at any suitable speed.

As shown, the first rotatable mirror 750 can be positioned along the first path 740. In this manner, each of the first plurality of laser beams 712 reflecting off of the first switchable mirror 730 as the reflected laser beam 714 directed along the first path 740 can reflect off of the first rotatable mirror 750. As shown, the first rotatable mirror 750 can include a plurality of optics 752. For instance, in some implementations, the first rotatable mirror 750 can include three separate optics 752 (e.g., a first optic, a second optic, and a third optic). In alternative implementations, the first rotatable mirror 350 can include more or fewer optics 752. As shown, each of the reflected laser beams 714 can reflect off of one of the optics 752 of the first rotatable mirror 750 as a reflected laser beam 715 directed towards an environment surrounding the LIDAR assembly 700.

When the first switchable mirror 730 is configured in the transmissive state (FIG. 11), the first switchable mirror 730 can transmit the first plurality of laser beams 712 to direct the first plurality of laser beams 712 along the second path 742 that is different than the first path 740. For instance, in some implementations, the electrochromatic material associated with each of the plurality of pixels of the first switchable mirror 730 can be configured in the translucent state such that the first switchable mirror 730 is transparent. In this manner, the first plurality of laser beams 722 can pass through the first switchable mirror 730.

In some implementations, the LIDAR assembly 700 can include a first stationary mirror 760 (e.g., fold mirror) positioned along the second path 742. In this manner, each of the first plurality of laser beams 712 can reflect off of the first stationary mirror 760 as a reflected laser beam 716. In some implementations, the LIDAR assembly 700 can include a second rotating mirror 754. The second rotating mirror 754 can, in some implementations, be configured to rotate about the second axis 704. For instance, in some implementations, the second rotatable mirror 754 can be configured rotate about the second axis 704 at a rotational speed ranging from 500 revolutions per minute to 700 revolutions. It should be understood, however, that the second rotating mirror 754 can be configured to rotate at any suitable speed.

In some implementations, the second rotatable mirror 754 can rotate about the second axis 704 faster or slower than the first rotatable mirror 750 rotates about the second axis 704. In alternative implementations, the first rotatable mirror 350 and the second rotatable mirror 754 can rotate about the second axis 704 at the same speed.

The second rotatable mirror 754 can be positioned relative to the first stationary mirror 760 such that the plurality of reflected laser beams 716 can reflect off of the second rotatable mirror 754. As shown, the second rotatable mirror 754 can include a plurality of optics 756. For instance, in some implementations, the second rotatable mirror 754 can include three separate optics 756 (e.g., a first optic, a second optic, and a third optic). In alternative implementations, the second rotatable mirror 754 can include more or fewer optics 756. As shown, each of the reflected laser beams 716 can reflect off of one of the optics 756 of the second rotatable mirror 754 as a reflected laser beam 718 directed towards an environment surrounding the LIDAR assembly 700.

When the second switchable mirror 732 is configured in the reflective state (FIG. 10), each of the second plurality of laser beams 722 can reflect off of the second switchable mirror 732 as a reflected laser beam 724 directed along the third path 746. In some implementations, the LIDAR assembly 700 can include a third rotatable mirror 770 configured to rotate about the second axis 704. In some implementations, the third rotatable mirror 770 can be configured to rotate about the second axis 704 at a rotational speed ranging from 500 revolutions per minute to 700 revolutions per minute. It should be understood, however, that the third rotatable mirror 770 can be configured to rotate about the second axis 704 at any suitable speed.

As shown, the third rotatable mirror 770 can be positioned along the third path 746. In this manner, each of the second plurality of laser beams 722 reflecting off of the second switchable mirror 732 as the reflected laser beam 724 directed along the third path 746 can reflect off of the third rotatable mirror 770. As shown, the third rotatable mirror 770 can include a plurality of optics 772. For instance, in some implementations, the third rotatable mirror 770 can include three separate optics 772 (e.g., a first optic, a second optic, and a third optic). In alternative implementations, the third rotatable mirror 770 can include more or fewer optics 772. As shown, each of the reflected laser beams 724 can reflect off of one of the optics 772 of the third rotatable mirror 770 as a reflected laser beam 725 directed towards an environment surrounding the LIDAR assembly 700.

When the second switchable mirror 732 is configured in the transmissive state (FIG. 11), the second switchable mirror 732 can transmit the second plurality of laser beams 722 to direct the second plurality of laser beams 722 along the fourth path 748 that is different than the third path 746. For instance, in some implementations, the electrochromatic material associated with each of the plurality of pixels of the second switchable mirror 732 can be configured in the translucent state such that the second switchable mirror 732 is transparent. In this manner, the second plurality of laser beams 722 can pass through the first switchable mirror 730.

In some implementations, the LIDAR assembly 700 can include a second stationary mirror 762 (e.g., fold mirror) positioned along the fourth path 748. In this manner, each of the second plurality of laser beams 722 can reflect off of the second stationary mirror 762 as a reflected laser beam 726. In some implementations, the LIDAR assembly 700 can include a fourth rotating mirror 774. In some implementations, the fourth rotating mirror 774 can be configured to rotate about the second axis 704. For instance, in some implementations, the fourth rotatable mirror 774 can be configured rotate about the second axis 704 at a rotational speed ranging from 500 revolutions per minute to 700 revolutions. In some implementations, the fourth rotatable mirror 774 can rotate about the second axis 704 faster or slower than the third rotatable mirror 770 rotates about the second axis 704. In alternative implementations, the fourth rotatable mirror 770 and the fourth rotatable mirror 774 can rotate about the second axis 704 at the same speed.

The fourth rotatable mirror 774 can be positioned relative to the second stationary mirror 762 such that the plurality of reflected laser beams 726 can reflect off of the fourth rotatable mirror 774. As shown, the fourth rotatable mirror 774 can include a plurality of optics 776. For instance, in some implementations, the fourth rotatable mirror 774 can include three separate optics 776 (e.g., a first optic, a second optic, and a third optic). In alternative implementations, the fourth rotatable mirror 774 can include more or fewer optics 776. As shown, each of the reflected laser beams 726 can reflect off of one of the optics 776 of the fourth rotatable mirror 774 as a reflected laser beam 728 directed towards an environment surrounding the LIDAR assembly 700.

Figure 12:
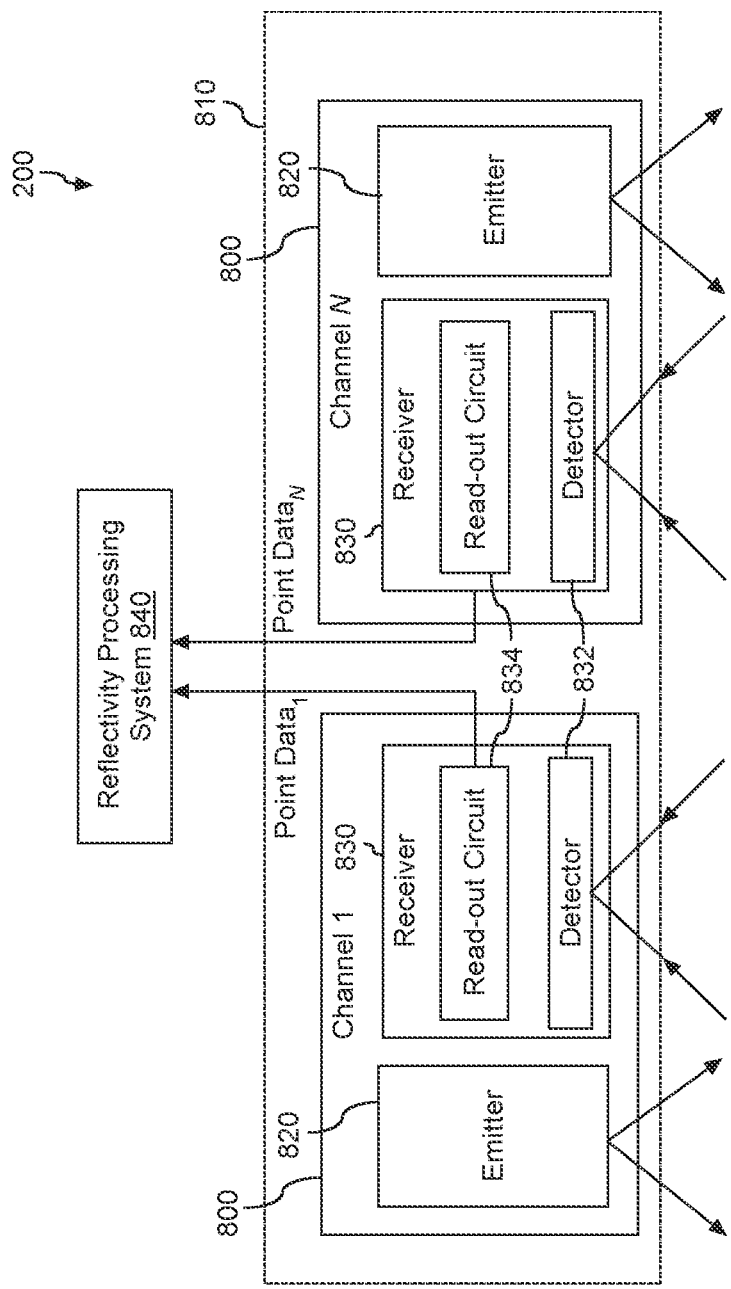
FIG. 12 depicts an example LIDAR system according to example embodiments of the present disclosure.

Referring now to FIG. 12, a block diagram of the LIDAR system 200 is provided according to example embodiments of the present disclosure. It should be understood that the LIDAR system 200 can be included as part of the sensors 155 discussed above with reference to FIG. 1. As shown, the LIDAR system 200 can include multiple channels 800; specifically, channels 1-N are illustrated. It should be understood that channels 1-N can be included in a single LIDAR unit 810 or may be spread across multiple LIDAR units 810. Each channel 800 can output point data that provides a single point of ranging information. The point data output by each of the channels 800 (e.g., point data$_{1-N}$) can be combined to create a point cloud that corresponds to a three-dimensional representation of the surrounding environment.

As shown, each channel 800 can include an emitter 820 paired with a receiver 830. The emitter 820 emits a laser signal into the environment that is reflected off the surrounding environment and returned back to a detector 832 (e.g., an optical detector) of the receiver 830. Each emitter 820 can have an adjustable power level that controls an intensity of the emitted laser signal. The adjustable power level allows the emitter 820 to be capable of emitting the laser signal at one of multiple different power levels (e.g., intensities).

The detector 832 can provide the return signal to a read-out circuit 834. The read-out circuit 834 can, in turn, output the point data based on the return signal. The point data can indicate a distance the LIDAR system 200 is from a detected object (e.g., road, pedestrian, vehicle, etc.) that is determined by the read-out circuit 834 by measuring time-of-flight (ToF), which is the time elapsed time between the emitter 820 emitting the laser signal and the receiver 830 detecting the return signal.

The point data further includes an intensity value corresponding to each return signal. The intensity value indicates a measure of intensity of the return signal determined by the read-out circuit 834. As noted above, the intensity of the return signal provides information about the surface reflecting the signal and can be used by the autonomy computing system 140 (FIG. 1) for localization, perception, prediction, and/or motion planning. The intensity of the return signals depends on a number of factors, such as the distance of the LIDAR system 200 to the detected object, the angle of incidence at which the emitter 820 emits the laser signal, temperature of the surrounding environment, the alignment of the emitter 820 and the receiver 830, and the reflectivity of the detected surface.

As shown, a reflectivity processing system 840 receives the point data from the LIDAR system 200 and processes the point data to classify specular reflectivity characteristics of objects. The reflectivity processing system 840 classifies the specular reflectivity characteristics of objects based on a comparison of reflectivity values derived from intensity values of return signals. In some embodiments, the LIDAR system 200 can be calibrated to produce the reflectivity values. For example, the read-out circuit 834 or another component of the LIDAR system 200 can be configured to normalize the intensity values to produce the reflectivity values. In these embodiments, the reflectivity values may be included in the point data received by the reflectivity processing system 840 from the LIDAR system 200. In other embodiments, the reflectivity processing system 840 may generate the reflectivity values based on intensity return values included in the point data received from the LIDAR system 200.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the LIDAR system 200 at each power level. The linear model assumes a uniform diffuse reflectivity for all surfaces and describes an expected intensity value as a function of a raw intensity variable, a calibration multiplier variable, and/or a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel 800 at each power level can be assigned to the corresponding channel/power level combination. In this way, each power level of each channel of the LIDAR system 200 can have an independently assigned calibration multiplier and bias value from which reflectivity values may be derived. Once assigned, the calibration multiplier and bias value of each channel/power level combination can be used at run-time to determine reflectivity values from subsequent intensity values produced by the corresponding channel at the corresponding power level during operation of an autonomous or semi-autonomous vehicle. More specifically, reflectivity values can be determined from the linear model by using the value of the calibration multiplier and the bias value for the calibration multiplier variable and bias variable, respectively. In this manner, the intensity values can be normalized to be more aligned with the reflectivity of a surface by taking into account factors such as the distance of the LIDAR system 200 to the detected surface, the angle of incidence at which the emitter 820 emits the laser signal, temperature of the surrounding environment, and/or the alignment of the emitter 820 and the receiver 830.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light detection and ranging (LIDAR) assembly comprising:
    a LIDAR unit comprising a housing defining a cavity, the LIDAR unit further comprising a plurality of emitters disposed within the cavity, each of the plurality of emitters configured to emit a laser beam;
    a switchable mirror positioned relative to the LIDAR unit such that the switchable mirror receives a plurality of laser beams exiting the housing of the LIDAR unit, the switchable mirror configurable in at least a reflective state with a material on the switchable mirror configured in an opaque state to reflect the plurality of laser beams and to direct the plurality of laser beams along a first path and a transmissive state with the material on the switchable mirror configured in a translucent state to allow the plurality of laser beams to pass through the switchable mirror;
    a stationary mirror coupled to the switchable mirror and configured to receive the plurality of laser beams that pass through the switchable mirror operating in the transmissive state and to direct the plurality of laser beams along a second path that is different than the first path to widen a field of view of the LIDAR unit along a first axis.

2. The LIDAR assembly of claim 1, further comprising:
    a first rotatable mirror and a second rotatable mirror, the first rotatable mirror and the second rotatable mirror each configured to rotate about a second axis that is substantially perpendicular to the first axis, the first rotatable mirror positioned along the first path and the second rotatable mirror positioned along the second path.

3. The LIDAR assembly of claim 2, wherein the plurality of emitters comprise a first plurality of emitters and a second plurality of emitters, each of the first plurality of emitters configured to emit a first laser beam having a first wavelength, each of the second plurality of emitters configured to emit a second laser beam having a second wavelength, the second wavelength being different than the first wavelength.

4. The LIDAR assembly of claim 3, wherein:
    the first wavelength ranges from 800 nanometers to 880 nanometers; and
    the second wavelength ranges from 890 nanometers to 930 nanometers.

5. The LIDAR assembly of claim 3, wherein the first rotatable mirror and the second rotatable mirror each comprise one or more dichroic optics, each of the one or more dichroic optics configured to optically act on the first laser beam and the second laser beam in a different manner to widen the field of view of the LIDAR unit along the second axis.

6. The LIDAR assembly of claim 5, wherein each of the one or more dichroic optics comprise a first surface and a second surface, the first surface configured as a beam splitter, the second surface configured as a mirror.

7. The LIDAR assembly of claim 6, wherein:
    the beam splitter is configured to transmit the first laser beam such that the first laser beam reflects off the second surface in a first direction as a reflected first laser beam extending above a third axis that is substantially perpendicular to the first axis and the second axis; and
    the beam splitter is configured to reflect the second laser beam in a second direction as a reflected second laser beam extending below the third axis.

8. The LIDAR assembly of claim 1, wherein the switchable mirror is rotatable about a second axis that is substantially perpendicular to the first axis.

9. The LIDAR assembly of claim 2, wherein the first rotatable mirror and the second rotatable mirror are each configured to rotate at a rotational speed ranging from 500 revolutions per minute to 700 revolutions per minute.

10. An autonomous vehicle comprising:
    a vehicle body; and
    a light detection and ranging (LIDAR) system comprising a plurality of LIDAR assemblies, each of the plurality of LIDAR assemblies coupled to the vehicle body at a different location thereon, each of the LIDAR assemblies comprising:
        a LIDAR unit comprising a housing defining a cavity, the LIDAR unit further comprising a plurality of emitters disposed within the cavity, each of the plurality of emitters configured to emit a laser beam;
        a switchable mirror positioned relative to the LIDAR unit such that the switchable mirror receives a plurality of laser beams exiting the housing of the LIDAR unit, the switchable mirror configurable in at least a reflective state with a material on the switchable mirror configured in an opaque state to reflect the plurality of laser beams and to direct the plurality of laser beams along a first path and a transmissive state with the material on the switchable mirror configured in a translucent state to allow the plurality of laser beams to pass through the switchable mirror; and a stationary mirror coupled to the switchable mirror and configured to receive the plurality of laser beams that pass through the switchable mirror operating in the transmissive state and to direct the plurality of laser beams along a second path that is different than the first path to widen a field of view of the LIDAR unit along a first axis.

11. The autonomous vehicle of claim 10, wherein each of the LIDAR assemblies further comprise:
a first rotatable mirror and a second rotatable mirror, the first rotatable mirror and the second rotatable mirror each configured to rotate about a second axis that is substantially perpendicular to the first axis, the first rotatable mirror positioned along the first path and the second rotatable mirror positioned along the second path.

12. The autonomous vehicle of claim 11, wherein the plurality of emitters comprise a first plurality of emitters and a second plurality of emitters, each of the first plurality of emitters configured to emit a first laser beam having a first wavelength, each of the second plurality of emitters configured to emit a second laser beam having a second wavelength, the second wavelength being different than the first wavelength.

13. The autonomous vehicle of claim 12, wherein:
the first wavelength ranges from 800 nanometers to 880 nanometers; and
the second wavelength ranges from 890 nanometers to 930 nanometers.

14. The autonomous vehicle of claim 12, wherein the first rotatable mirror and the second rotatable mirror each comprise a plurality of dichroic optics, each of the dichroic optics configured to optically act on the first laser beam and the second laser beam in a different manner to widen the field of view of the LIDAR unit the second axis.

15. The autonomous vehicle of claim 14, wherein each of the plurality of dichroic optics comprise a first surface and a second surface, the first surface configured as a beam splitter, the second surface configured as a mirror.

16. The autonomous vehicle of claim 15, wherein:
the beam splitter is configured to transmit the first laser beam such that the first laser beam reflects off the second surface in a first direction as a reflected first laser beam extending above a third axis that is substantially perpendicular to the first axis and the second axis; and
the beam splitter is configured to reflect the second laser beam in a second direction as a reflected second laser beam extending below the third axis.

17. A light detection and ranging (LIDAR) assembly comprising:
a first LIDAR unit and a second LIDAR unit, the first LIDAR unit and the second LIDAR unit each comprising a housing defining a cavity, the first LIDAR unit and the second LIDAR unit each further comprising a plurality of emitters disposed within the cavity, each of the plurality of emitters configured to emit a laser beam;
a first switchable mirror positioned relative to the first LIDAR unit such that the first switchable mirror receives a first plurality of laser beams exiting the housing of the first LIDAR unit, the first switchable mirror configurable in at least a reflective state with material on the first switchable mirror configured in an opaque state to reflect the first plurality of laser beams and to direct the first plurality of laser beams along a first path and a transmissive state with material on the first switchable mirror configured in a translucent state to allow the first plurality of laser beams to pass through the first switchable mirror and to direct the first plurality of laser beams along a second path that is different than the first path to widen a field of view of the first LIDAR unit along a first axis; and
a second switchable mirror positioned relative to the second LIDAR unit such that the second switchable mirror receives a second plurality of laser beams exiting the housing of the second LIDAR unit, the second switchable mirror configurable in at least the reflective state with a material on the second switchable mirror configured in an opaque state to reflect the second plurality of laser beams and to direct the second plurality of laser beams along a third path and the transmissive state with the material on the second switchable mirror configured in a translucent state to allow the second plurality of laser beams to pass through the second switchable mirror and to direct the second plurality of laser beams along a fourth path that is different than the third path to widen a field of view of the second LIDAR unit along the first axis.

18. The LIDAR assembly of claim 17, further comprising:
a first rotatable mirror and a second rotatable mirror each configured to rotate about a second axis that is substantially perpendicular to the first axis, the first rotatable mirror positioned along the first path;
a first stationary mirror positioned along the second path, the first stationary mirror configured to reflect the first plurality of laser beams to direct the first plurality of laser beams onto the second rotatable mirror;
a third rotatable mirror and a fourth rotatable mirror each configured to rotate about the second axis, the third rotatable mirror positioned along the third path; and
a second stationary mirror positioned along the fourth path, the second stationary mirror configured to reflect the second plurality of laser beams to direct the second plurality of laser beams onto the fourth rotatable mirror.

19. The LIDAR assembly of claim 18, wherein the plurality of emitters comprise a first plurality of emitters and a second plurality of emitters, each of the first plurality of emitters configured to emit a first laser beam having a first wavelength, each of the second plurality of emitters configured to emit a second laser beam having a second wavelength, the second wavelength being different than the first wavelength.

20. The LIDAR assembly of claim 19, wherein the first rotatable mirror and the second rotatable mirror each comprise a plurality of dichroic optics, each of the dichroic optics configured to optically act on the first laser beam and the second laser beam in a different manner to widen the field of view of the LIDAR unit along the second axis.

* * * * *

UNITED STATES PATENT AND TRADEMARK OFFICE
CERTIFICATE OF CORRECTION

| | | |
|---|---|---|
| PATENT NO. | : 12,092,744 B2 | Page 1 of 1 |
| APPLICATION NO. | : 17/129961 | |
| DATED | : September 17, 2024 | |
| INVENTOR(S) | : Borden et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this
Thirty-first Day of December, 2024

Derrick Brent
*Acting Director of the United States Patent and Trademark Office*